United States Patent [19]

Hall

[11] 4,131,321
[45] Dec. 26, 1978

[54] TORQUE LUG DRIVE

[76] Inventor: J. James A. Hall, 220 Kenbrook Dr. #6, Vandalia, Ohio 45377

[21] Appl. No.: 709,235

[22] Filed: Jul. 27, 1976
(Under 37 CFR 1.47)

[51] Int. Cl.² ............................................. B64C 25/42
[52] U.S. Cl. ................................... 301/6 A; 301/6 E; 188/264 R
[58] Field of Search ................ 301/6 A, 6 R, 6 CS, 301/6 E, 6 W, 6 WB; 188/71.5, 71.6, 264 R, 218 R, 218 XL

[56] References Cited

U.S. PATENT DOCUMENTS

| 2,017,715 | 10/1935 | Goodyear et al. | 301/6 A |
| 2,096,177 | 10/1937 | Hunt et al. | 188/218 R |
| 2,161,904 | 6/1939 | Sinclair | 188/264 R X |
| 2,457,344 | 12/1948 | Butler | 188/264 R X |
| 2,568,696 | 9/1951 | Albright | 188/71.5 X |
| 2,655,236 | 10/1953 | Bachman | 188/71.6 X |
| 3,191,735 | 6/1965 | Wavak | 301/6 A |
| 3,345,109 | 10/1967 | Petersen et al. | 301/6 R |
| 3,977,631 | 8/1976 | Jenny | 188/71.5 X |

FOREIGN PATENT DOCUMENTS 252569 3/1927 Italy ......................................... 188/71.5

Primary Examiner—Allen N. Knowles
Assistant Examiner—Charles A. Marmor

[57] ABSTRACT

A torque lug drive in which a relatively thin drum has axially extending lugs on the radially inner surface of the drum and circumferentially extending ribs on the radially outer surface of the drum. The torque lugs are mounted at spaced-apart positions around the drum and axially extending ribs are interposed between the lugs for reinforcing the drum. The drum is mounted on a wheel for engagement of the lugs with rotor members of a wheel and brake assembly.

4 Claims, 4 Drawing Figures

U.S. Patent  Dec. 26, 1978  4,131,321
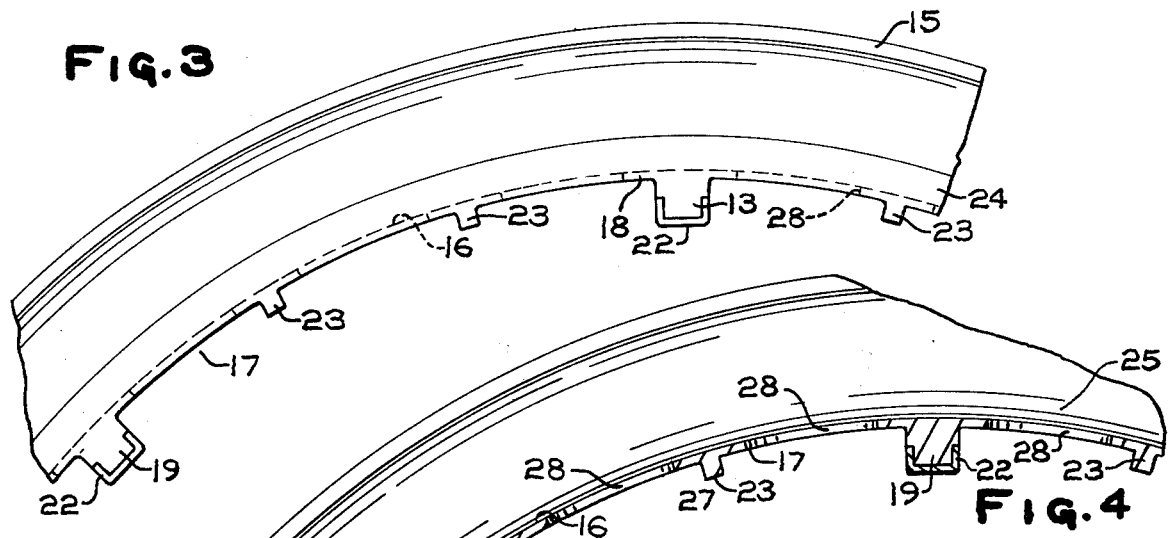
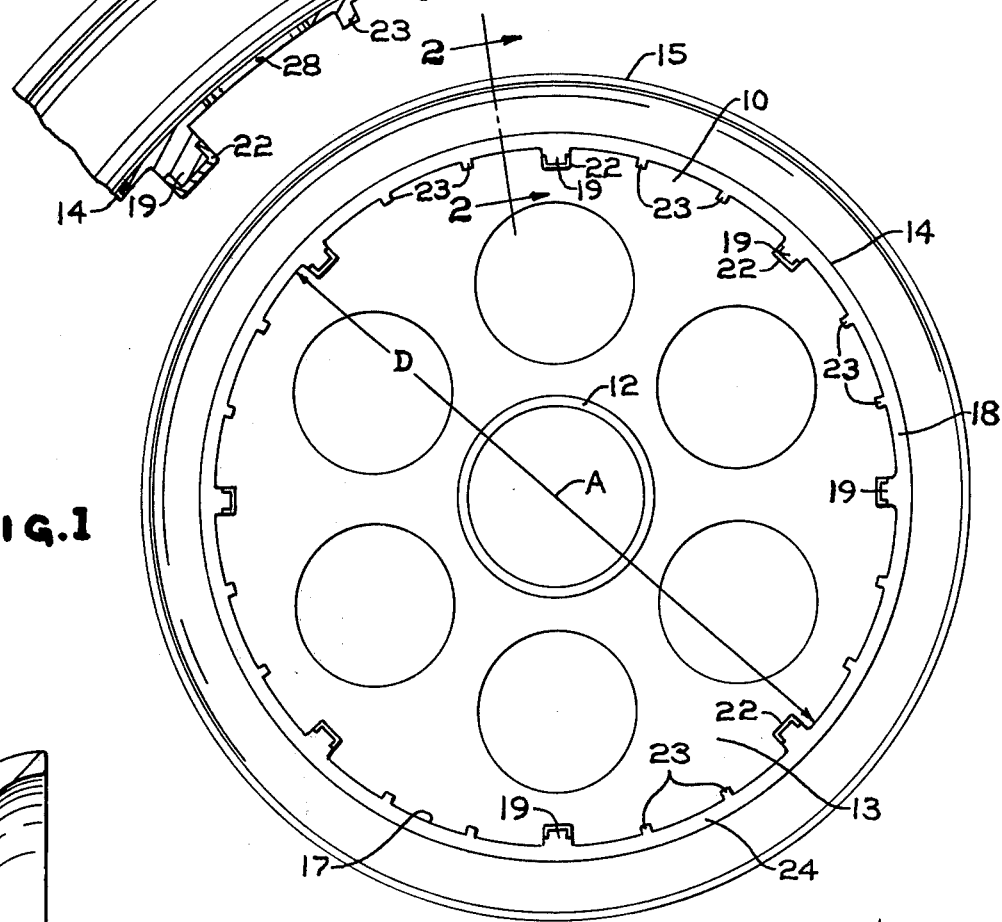
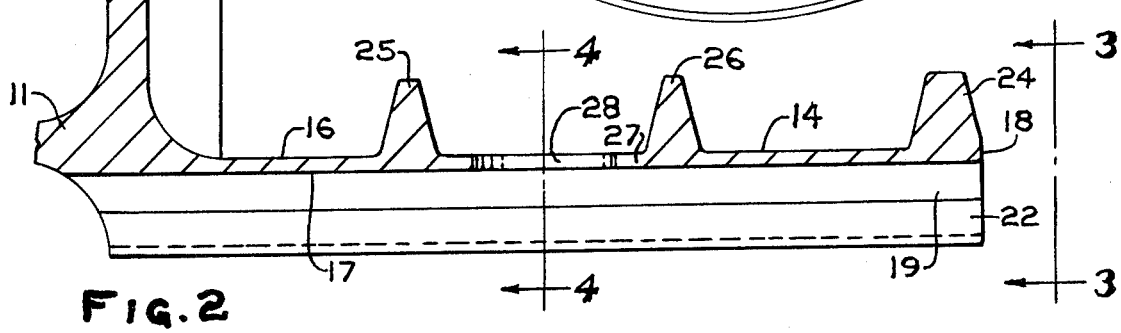

TORQUE LUG DRIVE

BACKGROUND OF THE INVENTION

This invention relates to disc-type brakes or clutches and particularly to the torque-transmitting drive lugs fastened to the wheels for engagement with brake rotors. These drive lugs have been mounted on the ends of wheels and have been in the form of individual cantilever members extending axially from the wheels. Problems with the cantilever drive lugs have included excessive deflection of the lugs in operation and high bending moments induced in the wheel by the drive lugs. The high bending moments have caused repeated high stresses in the wheel and resulted in fatigue failures. Furthermore, the drives and brake have been unprotected making the brake susceptable to damage in use. Also the diameter of the rotors and stators has been limited to the wheel size which has limited the swept area and determined the required number of rotors and stators for necessary braking. It has also been necessary to use relatively heavy cantilever drive lugs to provide the necessary strength for transmitting torque and holding the deflection of the lugs to a minimum.

SUMMARY OF THE INVENTION

According to this invention, a torque lug drive system is provided in which the drive lugs are mounted in a drum extending axially outward of the wheel. Annular ribs on the outside of the drum provide reinforcement of the drum and protection for the lugs. Additional axially extending ribs inside the drum provide further reinforcement of the drum which may be thin and lightweight because of the reinforcement.

The accompanying drawings show one preferred form made in accordance with and embodying this invention and is representative of how this invention may be practiced.

BRIEF DESCRIPTION OF THE DRAWINGS

In the drawings:

FIG. 1 is an axial elevational view of a wheel with the torque drive lugs mounted on a reinforced, cylindrical drum.

FIG. 2 is an enlarged fragmentary diametrical cross-sectional view of the wheel and drum taken along the plane of line 2—2 in FIG. 1.

FIG. 3 is an enlarged fragmentary axial elevational view taken along the plane of line 3—3 in FIG. 2

FIG. 4 is an enlarged fragmentary axial elevational sectional view taken along the plane of line 4—4 in FIG. 2.

DETAILED DESCRIPTION

Referring to FIG. 1, an inboard wheel half 10 of a typical aircraft wheel and brake assembly is shown which may be bolted to an outboard wheel half (not shown) for supporting a tire on a rim 11. The inboard wheel half 10 and the wheel and brake assembly are rotatable about an axis A which may be the axis of an axle (not shown) extending through hub member 12 of the wheel half 10. The wheel half 10 has a web member 13 extending from the hub member 12 to the rim 11.

As shown in FIGS. 1 and 2, a cylindrical drum 14 extends from a flange 15 on rim 11 axially away from the wheel half 10 and in coaxial relationship with the wheel half. The drum 14 is connected to the wheel half 10 and may be integral as shown in FIG. 2 or may be fastened by other suitable means such as bolts and nuts to the wheel half.

The drum 14 has an outer surface 16 and a cylindrical inner surface 17 with an outer edge 18 at the inboard end. Torque or drive lugs 19 are mounted on the inner surface 17 at circumferentially spaced-apart positions around the drum 14. The drive lugs 19 extend radially inward and axially across the inner surface 17 of the drum 14. The number of drive lugs 19 depends upon the design of the brake members (not shown) which are in engagement with the lugs. Eight circumferentially equidistant lugs 19 are shown in FIG. 1; however, seven lugs may be desirable for another wheel and brake assembly and some other number of lugs may be desirable for still another wheel and brake assembly.

As shown more clearly in FIGS. 2, 3 and 4, channel-shaped keyways 22 are mounted on inset portions of the lugs 19 and may be of wear-resistant material for engagement with the grooved brake members.

Interposed between the drive lugs 19 are reinforcing axial ribs 23 which extend axially across and radially inward of the drum 14. Preferably, the axial ribs 23 are circumferentially equidistant from adjacent ribs and the drive lugs 19.

An annular rib such as end ring 24 is mounted on the outer surface 16 of the drum 14 at the outer edge 18 for reinforcing the drum and protecting the lugs 19. Interposed between the flange 15 and the end ring 24 are intermediate annular ribs 25 and 26. The annular end ring 24 and intermediate annular ribs 25 and 26 on the outer surface 16 and the lugs 19 and axial ribs 23 on the inner surface 17 provide a lattice reinforcement of the drum 14 and accordingly a wall 27 of the drum may be made thin and lightweight and may also incorporate weight reducing and ventilating holes 28.

With this construction, the brake outside diameter indicated by letter D in FIG. 1 may be increased or decreased without changing the diameter of the wheel half 10 simply by increasing or decreasing the diameter of the drum 14. Since the drum 14 is located inboard of the wheel half 10, it can be increased in diameter with the only provision being that the outboard end of the drum be connected to the wheel half 10. By increasing the diameter of the drum 14, the brake members such as rotors and stators may be increased in diameter which in turn increases the effective swept area of the rotors and stators and provides greater braking force. The increased diameter of the drum 14 also makes possible the provision of the same braking force with fewer brake members and a reduction in the heat stack thickness measured axially of the drum as well as a reduction in the weight of the brake.

In the embodiment shown, the drum 14 has an outer diameter of approximately twenty-two inches and the wheel half 10 has an outer diameter of approximately twenty-eight inches as measured from the edges of the flange 15. The drive lugs 19 extend radially inward approximately five-eighths inch and the keyway 22 has a thickness of approximately one-eighth inch. The axially extending ribs 23 extend radially inward approximately one-quarter inch from the inner surface 17 of the drum 14 and have a width of approximately one-quarter inch. The lugs 19 have a width of approximately seven-eighth inch and the end ring 24 and intermediate annular ribs 25 and 26 have a radial thickness of approximately one-half inch. The end ring 24 is tapered but has a width of approximately one-half inch whereas the intermediate annular ribs 25 and 26 have widths of approximately one-quarter inch. As shown in FIG. 2, the wall of the drum 14 has a thickness measured radially of said drum which is substantially less than the thickness of the end ring 24 and the thickness of the intermediate annular ribs 25 and 26 measured axially of said drum. These dimensions are given to set forth the general relationship of the drum 14 to the reinforcing members; however, it is understood that the invention may be practiced with a drum and reinforcing members having different dimensions to meet the specific strength and braking requirements for specific brake applications.

We claim:

1. A torque lug mounting for an aircraft wheel half and disc-type brake assembly comprising a drum coaxial and integral with said wheel half, said wheel half having a rim with a flange, said drum extending axially away from said flange to an outer edge and having a thin lightweight wall with an outer surface and an inner surface, a thick annular reinforcing rib positioned on said outer surface at said outer edge and having a thickness measured axially of said drum which is substantially greater than the thickness of said wall measured radially of said drum and torque-transmitting lugs extending radially inward and axially across said inner surface at spaced-apart positions circumferentially of said drum for engagement with brake members of said assembly and for reinforcing said drum.

2. A torque lug mounting according to claim 1 wherein a second thick annular reinforcing rib is positioned on said outer surface and has a thickness measured axially of said drum which is substantially greater than the thickness of said wall measured radially of said drum, said second reinforcing rib being spaced from said first-mentioned annular reinforcing rib.

3. A torque lug mounting according to claim 2 wherein an intermediate thick annular reinforcing rib having a thickness substantially greater than said wall is spaced between said first annular reinforcing rib and said second annular reinforcing rib.

4. A torque lug mounting according to claim 3 wherein reinforcing axially extending ribs are spaced circumferentially from said lugs at positions between said lugs, said reinforcing axially extending ribs being mounted on said inner surface and extending radially inward and axially of said drum providing a lattice reinforcement of said drum with said annular reinforcing ribs on said outer surface.

* * * * *